Sept. 7, 1926.  E. ROBERTS  1,599,373
PULLEY FOR BRAKES AND THE LIKE
Filed Dec. 24, 1921    2 Sheets-Sheet 1

Inventor:
Eugene Roberts
by
Geo. N. Goddard, Atty.

Sept. 7, 1926.
E. ROBERTS
1,599,373
PULLEY FOR BRAKES AND THE LIKE
Filed Dec. 24, 1921
2 Sheets-Sheet 2
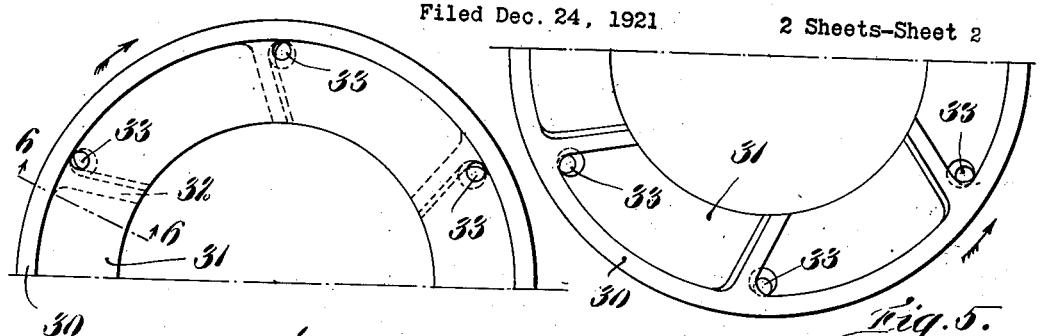
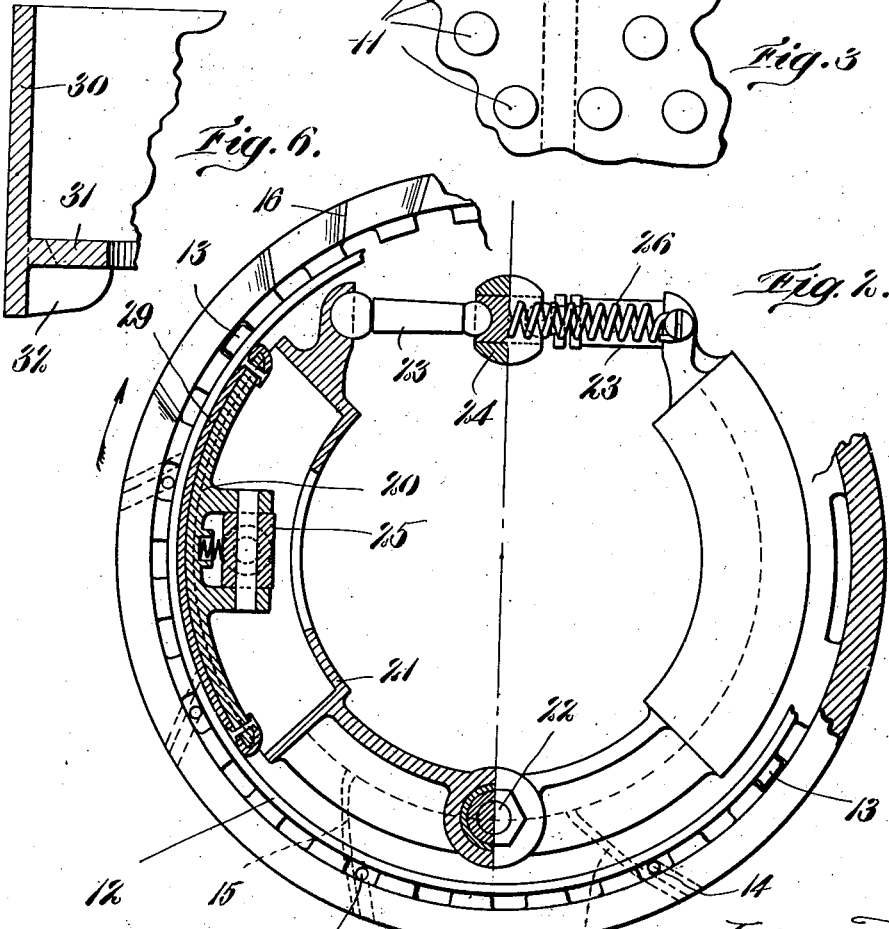
Inventor:
Eugene Roberts
by
Geo. N. Goddard, Atty.

Patented Sept. 7, 1926.

1,599,373

UNITED STATES PATENT OFFICE.

EUGENE ROBERTS, OF SALT LAKE CITY, UTAH, ASSIGNOR TO THE WESTERN STATES MACHINE COMPANY, OF SALT LAKE CITY, UTAH, A CORPORATION OF UTAH.

PULLEY FOR BRAKES AND THE LIKE.

Application filed December 24, 1921. Serial No. 524,663.

This invention relates to certain improvements in brake pulleys such as are used for driving centrifugal machines in which the belt pulley is provided with an interior friction face adapted to be engaged by an interiorly arranged brake, and is intended to provide a construction whereby a positive circulation of air is maintained when the pulley is in rotation to abstract from the pulley the heat generated by the friction of the brake shoes. It will also be understood that the same principles of construction are applicable whether the friction shoes are brake shoes or whether they are used as clutches to drive the belt pulley.

Generally speaking the invention comprises a belt pulley provided with an inside friction face combined with internally disposed gripping shoes arranged to be moved into engagement with said inside face, the pulley being provided with air-circulating passages so arranged as to direct currents of air through the interior of the pulley for the purpose of conducting away the heat generated by friction. This and other features of the invention will be fully explained in the following specification and will be defined in the claims hereto annexed.

In the drawings I have illustrated two different specific forms embodying the principles of this invention, in which:

Figure 2 is a plan view of the brake and belt pulley partly shown in section.

Figure 3 is a detail view of the interior construction of the pulley showing the studs or bosses which provide an air-circulating space inside the pulley.

Figure 4 is a top plan view illustrating a modified construction of pulley.

Figure 5 is a bottom plan view showing the same construction.

Figure 6 is a vertical section of the flanged rim portion of the same form of pulley shown in Figures 4 and 5.

Figure 1:
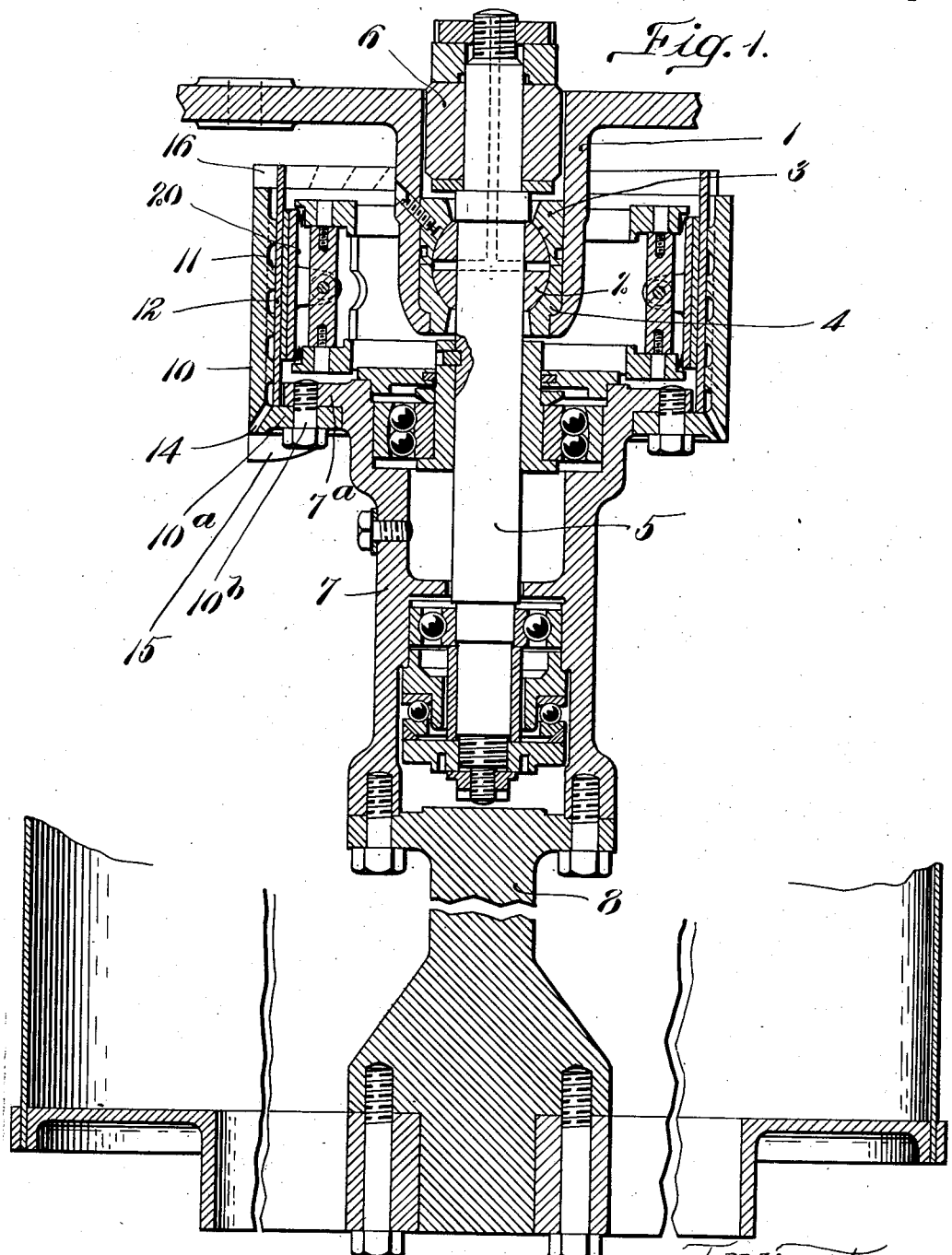
Figure 1 is a vertical central section illustrating the application of the principles of this invention to the driving pulley of a centrifugal machine, portions of the centrifugal machine being broken away to permit large scale illustration.

In Figure 1 I have illustrated in assembled relationship, one form of brake and combined belt and brake pulley applied to a centrifugal machine of the type in which the centrifugal is suspended from a hollow hanger 1 by a supporting bolt 2 secured to a gyratory suspension spindle 5, the bolt being mounted in upper and lower socket pieces 3 and 4 to permit gyration in all directions which gyration is yieldingly resisted by a centralizing buffer 6 interposed between the upper end of the spindle 5 and the surrounding portion of the hanger.

The rotary basket-supporting shaft in this case comprising upper hollow section 7 and lower solid section 8, is suspended upon this gyratory spindle for rotation by suitable rotary bearings.

At its upper end the shaft section 7 is provided with an outwardly projecting circular flange 7ª to which the belt pulley 10 is detachably secured by means of an inturned annular flange 10ª through the medium of suitable fastening bolts 10ᵇ.

In this form of the invention the rim or peripheral portion of the pulley 10 is provided on its interior face with a series of inwardly projecting bosses 11 forming, at frequent intervals, supports for a hardened steel friction ring 12 which is forced into the upper end of the pulley, and which is kept from slipping circumferentially therein by means of projecting ribs or bosses 13 which pass between adjacent rows of lugs or bosses 11 to form an interlocking engagement to prevent rotative slip of the friction ring inside the pulley. It will be seen that this construction leaves an interior air-circulating space between the friction ring and the pulley rim for the circulation of air.

To induce positive air circulation through this interior space, I provide a series of diagonal or outwardly inclined passages 14, preferably at the angle of intersection between the pulley rim and the inwardly turned flange. By making these air circulating openings or passages 14 open outwardly it will be seen that the tendency, due to the centrifugal force of rotation, is to expel the air through these outwardly extending passages which air is drawn in at the top of the pulley. This circulation of the air may be accelerated or assisted in two ways. In the first place, a series of inclined vanes 16 form in connection with the upper projecting end of the friction ring 12 a series of air-compressing pockets which tend to force the air into the spaces between the friction ring and the outer member or rim of the pulley thereby increasing the circulating action. Another means of assisting this action comprises inclined vanes 15 mounted on the bottom of the flange 10ª so that when the pulley rotates these vanes, arranged one in advance of each circulating passage, act to create a partial vacuum at the outlet end of the circulating passages to reenforce the air circulation.

So far as this invention is concerned, the particular construction of the brake shoe elements is immaterial. For purposes of illustration, however, I have shown a pair of brake shoes 20 pivotally mounted by a sort of gimbal joint element 25 in curved brake arms 21 which are fulcrumed upon a fixed pivoted post 22 carried by the hanger. The outer faces of the brake shoes are shown covered with strips 29 of brake lining material, while the brake shoes are forced apart by the action of toggle links 23 engaged by a vertically movable toggle spreading link 24. The two free ends of the brake levers or arms are held together by a contractile spring 26. Other details are deemed unnecessary since this part of the construction forms no part of the present invention.

In Figures 4 to 6 I have illustrated a somewhat simpler form of the invention in which the brake pulley is so constructed that the currents of air are blown directly across the inside brake-engaging or frictional surface of the pulley, the pulley rim in this case being solid without the internal air-cooling spaces shown in Figure 1.

In this form the pulley rim 30 is provided with the inwardly turned flange 31 located a slight distance above the bottom edge of the pulley rim. Beneath the flange is arranged a series of inwardly projecting vanes 32 intended to form, in connection with the flange and the pulley rim, air-compressing pockets. Preferably, in order to get a more effective air compressing action, these vanes 32 are inclined instead of being laid out on the radii of the pulley, and this inclination is preferably such that the lower edge and the inner end of each vane is in advance of their upper and their outer portions, respectively, as shown in Figures 4 and 5.

In each pocket, that is, in the angle between each vane, the outer rim and the inward flange, I provide an air-circulating passage or orifice as shown at 33 such orifice preferably being larger at its lower or intake end than at its upper or out-take end, and being also preferably inclined from bottom to top in a rearward and outward direction to assist in more effectually taking in the air and directing it with appreciable force over the inside face of the pulley rim.

During the normal operation or rotation of the pulley the surrounding air is compressed by reason of its own inertia in opposition to the rapidly moving vanes so as to be forced through the air circulating orifices or passages in steady streams, thereby extracting the heat from that portion of the pulley exposed to the frictional contact of the brake shoes with the result that the overheating of the pulley, with consequent injury to the belt and to the brake lining material, is avoided. The flaring or diagonal arrangement of the air-circulating openings tends to utilize the centrifugal force to induce a circulation of air currents, though where the maximum cooling action is desired the vanes should be used also.

What I claim is:

1. A combined driving pulley and brake for a centrifugal machine comprising an annular band provided with an inwardly projecting attaching flange, interiorly disposed shoes movable into and out of frictional engagement with the inside surface of the pulley, said pulley being provided adjacent to said flange with a series of inclined air passages arranged to maintain a series of air currents through the interior of the pulley when rotating, to abstract heat generated by the friction of said shoes, substantially as described.

2. A combined driving pulley and brake for centrifugal machines, embracing in its construction an annular inwardly flanged driving pulley provided with a series of air circulating passages adjacent to said flange, a coacting series of vanes arranged on said pulley adjacent to the air circulating passages to force air therethrough, and interiorly disposed shoes movable into frictional engagement with the inside wall of said pulley, substantially as described.

3. In an expansible brake, the combination of an external pulley, internally disposed shoes arranged to be expanded against the inside surface of said pulley to form frictional engagement therewith, and oblique air circulating passages arranged in said pulley to direct currents of air against the inside of the pulley and thus abstract the heat therefrom, substantially as described.

4. A brake comprising a pulley and coacting shoes movable into and out of frictional engagement with said pulley, the pulley being provided with a series of oblique openings so inclined as to maintain a positive flow of air current by centrifugal action against the shoe-engaged face of the pulley when the pulley rotates and thereby abstract heat generated by the contact with the shoes, substantially as described.

5. A brake comprising a rotatable pulley, coacting shoes movable into and out of frictional engagement with said pulley, said pulley being provided with a series of air circulating openings, arranged to direct air currents against the shoe-engaged surface of the pulley, a series of coacting vanes arranged to deflect air through said openings when the pulley rotates, whereby the air forced through said openings flows over the interior of the pulley to abstract heat generated by the friction of said shoes, substantially as described.

6. The combination of a rotatable belt pulley, interiorly disposed shoes movable into frictional engagement with the inside surface of the pulley, a series of inclined vanes arranged at intervals around the inside of said pulley offset to the plane of said shoes, said pulley being provided with a series of air circulating passages between the vanes and the pulley rim to direct air currents through the pulley and thereby abstract therefrom heat generated by the friction of said shoes, substantially as described.

7. The combination of a rotatable belt pulley embracing a peripheral rim provided with an inwardly projecting flange, interiorly disposed brake shoes movable into frictional engagement with the inside face of said pulley above said flange, a series of vanes arranged beneath said flange to form a series of air-circulating members when the pulley rotates, said pulley being provided with a series of air-circulating holes close to said vanes to produce flow of air currents across said rim interiorly thereof in order to abstract heat therefrom, substantially as described.

8. In a device of the class described, the combination of a rotatable pulley coacting interiorly arranged friction shoes movable into frictional engagement therewith, said pulley being provided with a series of inclined air circulating passages having their outlet ends farther from the centre of the pulley than their intake ends thereby utilizing the centrifugal force of rotation to induce circulation of air, said passages being arranged to direct currents of air through the pulley to abstract heat generated by frictional engagement with said shoes, substantially as described.

In witness whereof, I have subscribed the above specification.

EUGENE ROBERTS.